(12) United States Patent
Imai et al.

(10) Patent No.: US 7,022,230 B2
(45) Date of Patent: Apr. 4, 2006

(54) FILTRATION DEVICE

(75) Inventors: Fumihito Imai, Moriyama (JP); Walter Polak, Salzburg (AT)

(73) Assignees: Tohzai Electric Co. Ltd, Shiga (JP); P & W Invest Vermoegens Verwaltungsgesellschaft M.B.H., Salzburg (AT)

( * ) Notice: Subject to any disclaimer, the term of this patent is extended or adjusted under 35 U.S.C. 154(b) by 0 days.

(21) Appl. No.: 10/486,324

(22) PCT Filed: Dec. 14, 2001

(86) PCT No.: PCT/JP01/11012

§ 371 (c)(1),
(2), (4) Date: Feb. 9, 2004

(87) PCT Pub. No.: WO03/051486

PCT Pub. Date: Jun. 26, 2003

(65) Prior Publication Data

US 2004/0195162 A1    Oct. 7, 2004

(51) Int. Cl.
*B01D 24/14* (2006.01)
*B01D 24/40* (2006.01)

(52) U.S. Cl. ........................ 210/289; 210/291
(58) Field of Classification Search ................ 210/289, 210/291, 456
See application file for complete search history.

(56) References Cited

U.S. PATENT DOCUMENTS 3,448,043 A * 6/1969 Vajna .......................... 210/673
3,493,116 A * 2/1970 Edmiston .................... 210/266
5,203,995 A * 4/1993 Fernando .................... 210/274

FOREIGN PATENT DOCUMENTS

| DE | 20 59 261 A | 6/1972 |
| DE | 19728738 | 7/1999 |
| EP | 0943 364 A | 9/1999 |
| GB | 1 342 082 A | 12/1973 |
| JP | 2000-024485 | 1/2000 |
| JP | 2002-001015 | 1/2002 |

* cited by examiner

*Primary Examiner*—Ivars C. Cintins
(74) *Attorney, Agent, or Firm*—The Webb Law Firm

(57) ABSTRACT

The invention relates to a filtering apparatus including, inside a filtering tower (1), a filtering section (r), a liquid collecting section (7) and a liquid feeding section (e). The liquid feeding section (e) includes a diffuser (A) attached to an upwardly oriented orifice (5a) formed at a leading end of a liquid feeding pipe (5). The object is to provide an apparatus which allows use of the existing filtering tower without its enlargement and which allows uniform falling of the filtering liquid over the substantially entire top surface of the filter medium layer, thus making it readily possible to maintain the flatness of the top surface of the filter medium layer even when light-weight medium is employed, thereby to allow the filter medium layer as well as the entire filtering apparatus to achieve their desired filtering performance. The diffuser (A) includes a damping portion (k) for damping the momentum of the liquid discharged from the orifice (5a), a first discharging portion (8) for upwardly discharging the liquid damped by the damping portion (k), a second discharging portion (9) for laterally discharging the liquid damped by the damping portion (k), and a third discharging portion (10) for downwardly discharging the liquid damped by the damping portion (k), said first, second and third discharging portions being stacked one on another from the top to the bottom in the mentioned order.

3 Claims, 6 Drawing Sheets

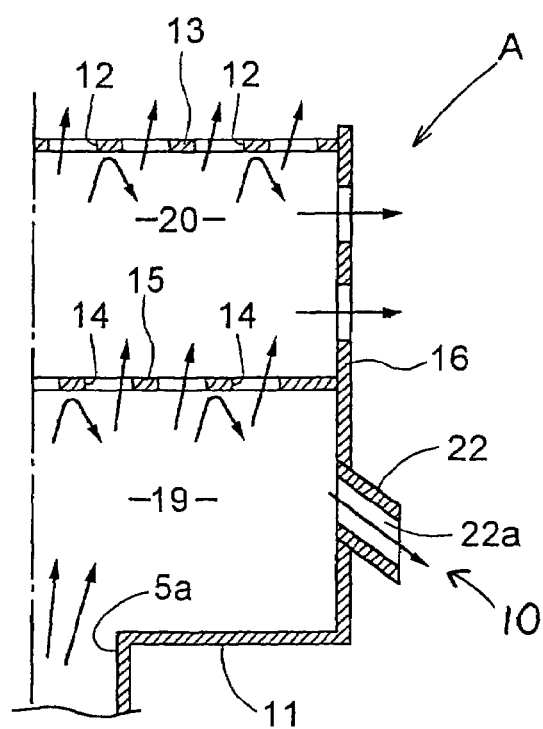
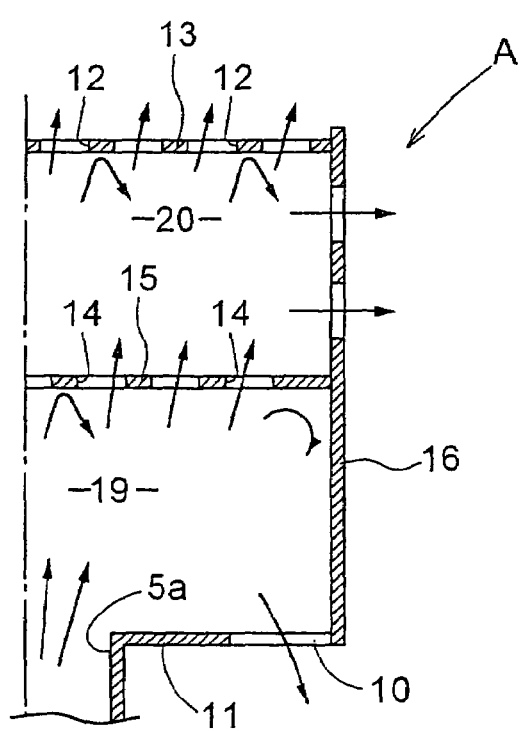

FILTRATION DEVICE

BACKGROUND OF THE INVENTION

1. Field of the Invention

The present invention relates to a filtering apparatus for filtering liquid such as water. More particularly, the invention relates to a technique for achieving efficient filtration wherein the momentum of the liquid discharged upward is effectively restricted within a small space, thereby to allow uniform infiltration of the liquid over a surface of a filter medium inside a relatively small filtering tower.

2. Description of the Related Art

A conventional filtering apparatus shown in FIG. 9 includes, within a filtering tower 1 having a lid, a filtering section (r) comprising a plurality of kinds of filter media, a liquid collecting section 7 disposed downwardly of the filtering section (r), and a liquid feeding section (e) disposed upwardly of the filtering section (r). The liquid feeding section (e) includes a liquid feeding pipe 5 inserted into the filtering tower 1 from the outside thereof and having an orifice 5a oriented upward and formed at the leading end thereof, and a diffuser (A) for acting on the liquid being discharged upward from the orifice 5a.

The diffuser A is a tapered construction whose diameter increases upward. In other words, this diffuser comprises a funnel-like member for allowing the liquid to be filtered to be discharged while being diffused toward the outer peripheral side over a wide range from the upward direction to obliquely upward directions. With this, a portion of the liquid discharged from the orifice 5a is caused to run along a ceiling face 1b of the filtering tower 1 while another portion thereof is caused to fall before reaching the ceiling face 1b. Consequently, the filtering liquid is intended to fall uniformly onto over substantially entire top surface of a filter medium layer 4.

However, it has been shown that when the filtering apparatus having the above-described conventional construction is actually put into use, as indicated by arrows in FIG. 9, most of the filtering liquid discharged from the diffuser A flows down along the ceiling face 1b and an inner peripheral surface of a lateral face 1a, that is, the liquid flows down in a concentrated manner on the outer peripheral side inside the cylindrical filtering tower 1. And, it has been confirmed that by the momentum of the liquid concentrated on the outer peripheral side of the filtering tower 1, the filter medium layer 4 is disturbed and stirred up and displaced toward the vertical axis of the filtering tower 1, so that as shown in FIG. 9 the upper surface of the filter medium layer 4 is formed into a mountain-like shape with the inner radius side thereof being raised and its outer radius side thereof being depressed. That is to say, in the actual use, the liquid is concentrated on the outer peripheral side and may not be diffused sufficiently over the entire top surface of the filter medium layer 4. As a result, the flatness of the top surface of the filter medium layer 4 tends to be impaired, thus tending to invite insufficient filtering performance of the filter medium layer 4. In this respect, there has been room for improvement.

The occurrence of the above-described problem seems to be attributable to a background situation as follows. Namely, as the filter media employed by the conventional filtering apparatus, medium consisting mainly of sand having a relative large specific gravity was often employed previously. Hence, when the liquid is discharged at a standard discharge speed (2 m/sec approximately), the filtering operation was possible with maintaining the flatness of the top surface of the filter medium layer 4. In recent years, however, in order to allow effective back washing of the filter medium layer 4 with a limited amount of water, media comprising special ceramic, activated carbon or the like having a relatively small specific gravity have often been employed. With such decrease in the specific gravity of the material forming the filter medium layer 4, the above-described phenomenon of stirring-up of the filter media and the resultant impairment of the flatness of the top surface of the filter medium layer 4 tends to occur more likely (the term "back washing" refers to an operation or process in which in the event of reduction in the filtering ability due to e.g. accumulation of solid content in the filtering liquid on the filter medium layer, the water is discharged from the liquid collecting section 7 provided at the lower portion of the filtering tower and adapted normally for collecting the filtered water or the like, thereby to release the solids from the filter medium layer 4, so that the released solids may be discharged together with the back washing water through the diffuser A operable normally for discharging the liquid to be filtered).

Therefore, with such reduction in the weight of the filter medium, even with the discharging speed of water remaining the same as before, the surface of the filter medium tends to be disturbed to impair the flatness of the top face of the filter media. Hence, concentration of the filtering liquid occurs at the bottomed or lowered areas in the filter media surface, thus resulting in deterioration of filtering precision as well as reduction in the effective volume of the filter media 4 actually effective for entrapment of solids or the like contained in the filtering liquid. Consequently, the filtering operation period will be reduced disadvantageously and the filtering efficiency will also suffer.

In order to achieve uniformity in the falling movement of the filtering liquid for solving the above-described inconvenience, it is conceivable to reduce the discharging speed of water or conversely to increase the capacity of the filtering tower. With the former method, however, the filtering ability per unit time period, namely, the filtering efficiency, will be reduced. With the latter method, the space required for installing the filtering tower and the cost of the tower will increase disadvantageously, malting the existing system unusable. Hence, in reality, neither method have been able to provide an effective solution.

An object of the present invention is to provide an apparatus which allows use of the existing filtering tower without its enlargement and which allows uniform falling of the filtering liquid over the substantially entire top surface of the filter medium layer 4, thus maling it readily possible to maintain the flatness of the top surface of the filter medium layer 4 even when light-weight medium is employed, thereby to allow the filter medium layer 4 as well as the entire filtering apparatus to achieve their desired filtering performance.

SUMMARY OF THE INVENTION

The essential concept of the invention lies in configuring, in place of the conventional simple funnel-like diffuser, a diffuser which provides a damping function for damping the momentum of water discharged from an orifice within the diffuser as well as a diffusing discharging function for diffusing and discharging the damped liquid flow in a plurality of directions. In other words, the concept is to provide the diffuser with high function and multiple functions.

Namely, as illustrated in FIGS. 1 and 2, a filtering apparatus includes, within a filtering tower 1 having a lid, a filtering section (r), a liquid collecting section 7 disposed downwardly of the filtering section (r), and a liquid feeding section (e) disposed upwardly of the filtering section (r), the liquid feeding section (e) including a liquid feeding pipe 5 inserted into the filtering tower 1 from the outside thereof and having an orifice 5a oriented upward and formed at the leading end thereof, and a diffuser (A) for acting on the liquid being discharged upward from the orifice 5a;

wherein said diffuser (A) includes a damping portion (k) for damping the momentum of the liquid discharged from the orifice (5a), a first discharging portion 8 for upwardly discharging the liquid damped by the damping portion (k), a second discharging portion 9 for laterally discharging the liquid damped by the damping portion (k), and a third discharging portion 10 for downwardly discharging the liquid damped by the damping portion (k), said first, second and third discharging portions 8, 9 and 10 being stacked one on another from the top to the bottom in the order of the first discharging portion 8, the second discharging portion 9 and the third discharging portion 10.

The diffuser includes the damping portion for damping the momentum of the liquid discharged from the orifice of the liquid feeding section, and this damped liquid is discharged upwardly, laterally and downwardly from the diffuser. Hence, the liquid can fall gently onto the filter media surface over a large area inside the filtering tower. Therefore, the phenomenon with the conventional apparatus, i.e. the stirring-up disturbance of the filter medium due to the strong collision of the liquid against the outer radius area is eliminated, and the filtering operation can proceed with the top surface of the filter medium being maintained flat. Consequently, it is possible to effectively utilize the entire filter medium and the desired filtering precision and continuous operation time can be obtained.

That is to say, according to the invention, the construction of the diffuser is modified so that the momentum of the filtering liquid discharged from the orifice of the liquid feeding section can be damped within the diffuser and also this liquid has been directed already in the multiple directions of upper, lateral and downward directions when it is about to be discharged from the diffuser. Therefore, there is achieved the distinguished effect of eliminating necessity of making any modifications in the parts of the apparatus, such as the shape or capacity of its filtering tower per se or the discharging speed of the filtering liquid at the orifice of the liquid feeding section, other than the above modification of the diffuser construction.

With the inventive modification of the diffuser construction, after the filtering liquid has been damped within the diffuser, this liquid can be discharged inside the filtering tower over an extended angular range from the upward, lateral and downward sides. Hence, the feeding of the liquid to the filter medium can take place in the most uniform condition possible, with using the existing system without enlargement of the filtering tower and also with using the light-weight filter medium which can reduce the amount of water required for back washing. As a result, the desired filtering performance can be obtained without disturbing the flatness of the top surface of the filter material, and the total performance of the apparatus has been further improved.

As illustrated in FIG. 2, the diffuser A includes a box body (b) consisting essentially of a bottom face member 11 defining said orifice 5a, a top face member 13 disposed upwardly of the bottom face member 11, and a lateral face member 16 extending from the bottom face member 11 to the top face member 13, a partitioning member 15 having a plurality of holes being interposed between the bottom face member 11 and the top face member 13;

wherein upper and lower spaces 20, 19 partitioned from each other by said partitioning member 15 together form said damping portion (k);

said first discharging portion 8 comprises a plurality of upwardly directed holes 12 defined in said top face member, said second discharging portion 9 comprises a plurality of lateral holes 17 defined in said lateral face member at a portion thereof located between said top face member and said partitioning member; and said third discharging portion comprises a laterally elongated slot 18 formed at a portion of said lateral face member at a portion thereof downwardly spaced apart from said partitioning member by a predetermined distance.

The liquid discharged from the orifice of the liquid feeding section first reaches the partitioning member and a portion of this liquid passes the holes of this partitioning member to flow to the upper space of the partitioning member, whereas the remaining portion of the liquid collides against the remaining face portion of the plate other than the holes thereof will be bounced back and flow obliquely downward. This collision against the partitioning member provides reduction in the discharging speed of the liquid, that is, the damping effect. The liquid discharged from the orifice will be discharged upward while being laterally diffused over a diffusion angle determined by the kind of the liquid or the properties thereof. Hence, a portion of the liquid will move along the vertical direction to reach the partitioning member, while a further portion of the liquid will flow obliquely upward to reach the partitioning member. Accordingly the liquid passing through the holes of the partitioning member includes a portion moving obliquely upward, etc. Also, regarding the bouncing direction of the liquid collided against and bounced back from the partitioning member, a portion of the liquid will be bounced along the vertical direction while another portion will be bounced along an obliquely downward direction.

And, since the third discharging portion comprising an elongate slot is provided at a height position of the lateral face member of the box body forming the diffuser, which position is spaced apart from the partitioning member downwardly by a predetermined distance, there is obtained a tendency that the portion of the liquid bounced off the partitioning member having a relative large incident angle (reflection angle), that is, the bounced liquid portion resulting from a near head-on collision, will be discharged through the elongate slot to the outside of the diffuser. This means that the third discharging portion discharges the bounced liquid portion whose momentum has been sufficiently damped as the result of its collision at a large incident angle causing significant energy loss and which flows along the obliquely downward direction having a relatively large downward vector component (see FIG. 2). Further, since this third discharging portion comprises a laterally elongated slot, this discharges the liquid obliquely downward over the maximum peripherally extended angular range.

The liquid portion introduced through the holes of the partitioning member into the upper space will then move upward with further lateral diffusion to reach the top face. In the course of this, in case this upper space has a sufficient vertical height, the liquid portion may reach the lateral face directly. Therefore, the liquid portion reaching the holes of the top face will be discharged directly through the upward holes acting as the first discharging portion toward the ceiling face of the filtering tower, whereas the liquid portion which has collided against the top face will be bounced off to move then downward or obliquely downward.

That is to say, the liquid portion discharged from the first discharging section will be discharged while being damped by the constricting effect when it is caused to pass the holes at the two portions in the partitioning member and the top face member and the further effect when it is forced to pass the upper and lower spaces. And, the liquid portion which has collided against the top face member and been bounced off it will be discharged from the lateral holes while being disturbed within the upper space, i.e. through the second discharging portion to the outside of the diffuser. And, its discharging operation will take place laterally over a relatively large angular range including the obliquely downward, horizontal, obliquely upward directions, etc. With the above-described functions combined, as shown in FIG. 1, the liquid discharged through the first through third discharging portions to the outside of the diffuser will be diffused over the wide angular range from the vertical upward to the nearly perpendicular, obliquely downward directions and in the effectively damped condition.

With such diffuser which can be easily made, wherein the partitioning member defining a plurality of holes is disposed inside a box body defining the number of holes and the elongate slot in its lateral face and top face, the distinguished effect of the invention can be obtained. Therefore, the intended object has been achieved economically and reasonably.

As illustrated in FIG. 3a and FIG. 3b, the holes 14 defined in the partitioning member 15 and the holes 12 defined in the top face member 13 are arranged so as not be overlapped in a plan view.

The holes disposed vertically relative to each other are so arranged not to be overlapped with each other in the plan view. This arrangement makes it difficult for the liquid discharged from the orifice to pass the holes at these two upper and lower positions smoothly without any interference. In other words, the arrangement can ensure that the liquid just passing the holes 14 of the partitioning member 15 may be reliably guided so as to subsequently collide against the bottom face of the top face member 13. As a result, the liquid from the first discharging portion can be discharged in as much damped condition as possible.

Through the inventive arrangement of the holes of the partitioning member and the holes of the top face member without their overlapping in the plan view, the filtering apparatus provides the advantage of enhancing the effect resulting from the construction without inviting cost increase.

Incidentally, although reference marks and numerals were provided in the above description for facilitating reference to the accompanying drawings, it is understood that the provision of the marks and numerals is not to limit the scope of the invention to the constructions shown in the drawings.

BRIEF DESCRIPTION OF THE DRAWINGS

FIG. 5 is a side view in section showing a second alternative construction of principal portions of the diffuser, FIG. 6 is a side view in section showing a third alternative construction of principal portions of the diffuser.

DETAILED DESCRIPTION Of THE INVENTION

For describing the invention in greater details, the invention will be described with reference to the accompanying drawings.

Figure 1:
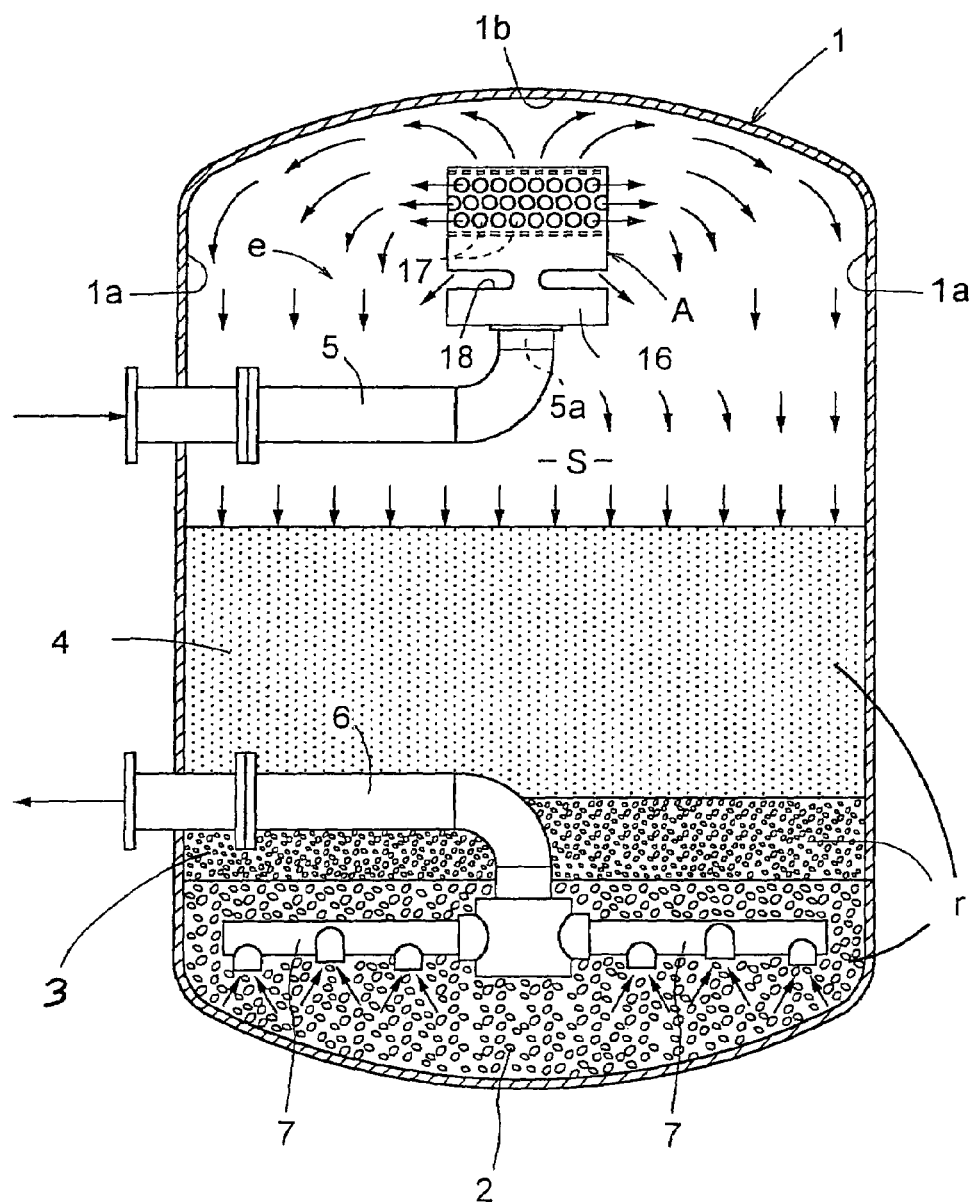
FIG. 1 is a partially cutaway side view showing a filtering apparatus.

A water filtering apparatus shown in FIG. 1 includes, within a filtering tower 1 formed like a closed cylinder, a filtering section (r) comprising a first support silica rock layer 2, a second support silica rock layer 3 and a filter medium layer 4 stacked from the bottom to the top in the mentioned order, a water-reserving space S formed upwardly of the filter medium layer 4 and a liquid feeding section (e) provided upwardly of the filtering section (r).

The liquid feeding section (e) includes, within the water-reserving space S, a horizontally oriented inlet pipe (an example of "liquid feeding pipe") 5 inserted into the filtering tower 1 through a lateral wall 1a of the tower 1 and having an upwardly directed orifice 5a at the leading end thereof, and a diffuser A for acting on water as being upwardly discharged from the orifice 5a. Further, there are provided an outlet pipe 6 extending through the lateral wall 1a and a water collecting pipe (an example of "water collecting section") 7 extending continuously from the leading end of the pipe 6 and being exposed to the first support silica rock layer 2.

Figure 2:
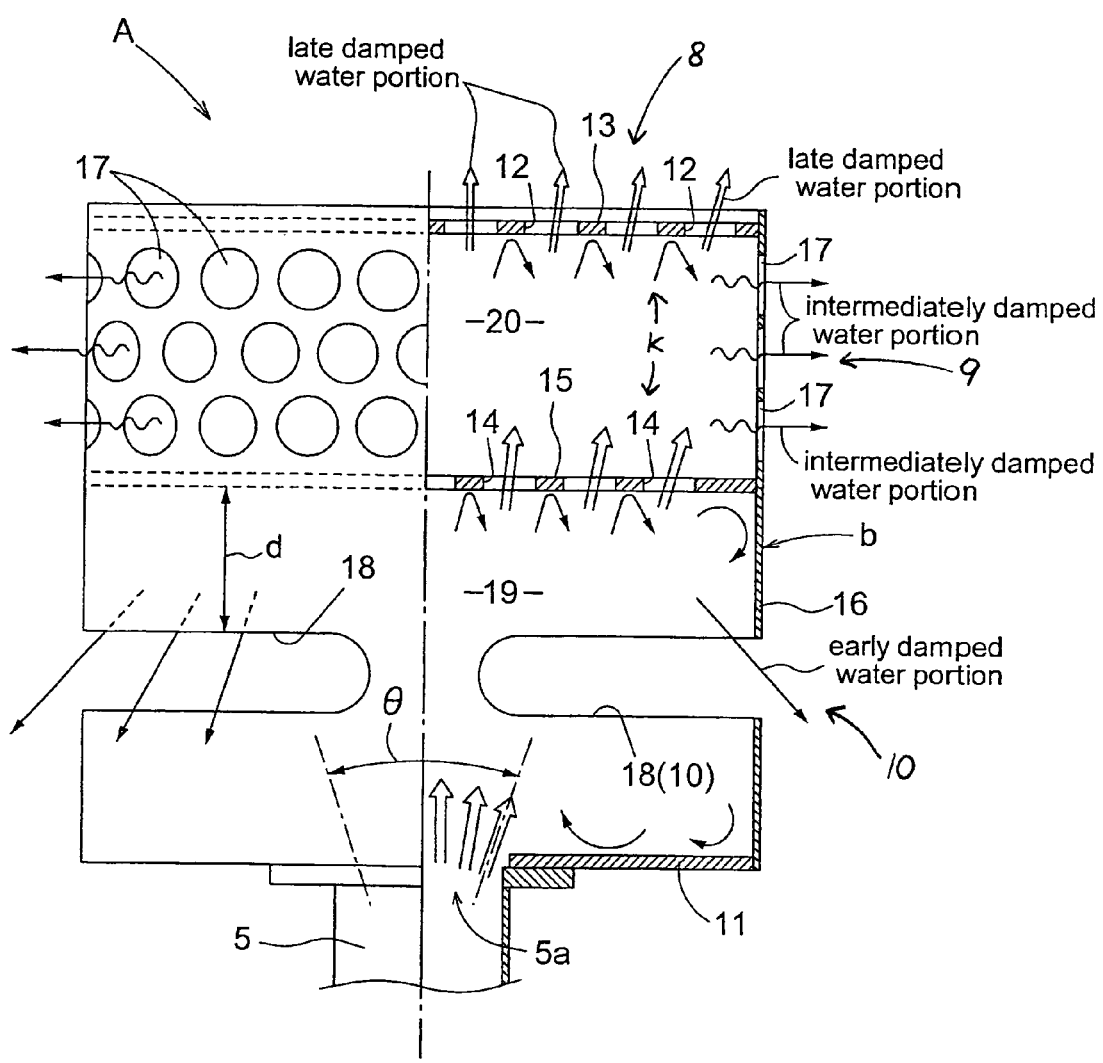
FIG. 2 is a side view in half section showing a diffuser construction.

As shown in FIG. 2, the diffuser A includes a damping portion (k) for damping the momentum of water (example of "filtering liquid" or "liquid to be filtered") discharged from the orifice 5a and a discharging section for discharging the water damped by the damping portion (k) to the outside of the diffuser A. The discharging section includes a first discharging portion 8 for upwardly discharging the water damped by the damping portion (k), a second discharging portion 9 for laterally discharging the water damped by the damping portion (k), and a third discharging portion 10 for downwardly discharging the water damped by the damping portion (k), said first, second and third discharging portions 8, 9 and 10 being stacked one on another from the top to the bottom in the mentioned order.

Referring the construction in greater details, the diffuser A includes a cylindrical box body (b) consisting essentially of a bottom face member 11 defining the orifice 5a, a top face member 13 defining a number of upwardly directed holes 12 (an example of the "first discharging portion 8"), and a lateral face member 16 extending vertically from the bottom face member 11 to the top face member 13. And, a partitioning member 15 (an example of the "damping section") defining a number of holes 14 is interposed between the bottom face member 11 and the top face member 13. And, in the lateral face member 16 at a portion thereof facing a second space 20 formed between the top face member 13 and the partitioning member 15, there are formed a number of lateral holes 17 (an example of the "second discharging portion 9"). And, also in the lateral face member 16, at a further portion thereof facing a first space 19 formed between the partitioning member 15 and the bottom face member 11 and downwardly spaced apart from the partitioning member 15 by a predetermined distance, there are formed a plurality of laterally elongated slots 18 (an example of the "third discharging portion 10") arranged along the peripheral direction.

The functions of the diffuser A will be briefly described. As shown in FIG. 2, a portion of the impact water discharged from the orifice 5a is damped due to the effect of its collision against the partitioning member 15 acting as the damping section (k) and also changed in its direction, so that this water portion is discharged as "early damped water portion" (in this case, the word "damped" means reduction of momentum) from the elongate slots 18 (third discharging portion 10). A further portion of the impact water which has passed the holes 14 of the partitioning member 15 upward is damped due to the effect of its collision against the top face member 13 acting as another damping portion (k) and changed in its direction, so that this water portion is discharged as "intermediately damped water portion" from the lateral holes 17 (second discharging portion 9). Still another portion of the water, as force remaining water portion, will move further upward and will be discharged as "late damped water portion" upwardly from the upwardly directed holes 12 (first discharging portion 8). Next, these functions will be described in greater details.

The water discharged upward from the orifice 5a will move upward while being laterally diffused over a diffusion angle θ and will advance through the first space 19 to reach and collide against the partitioning member 15. This water collided against and bounced off the partitioning member 15 will then return into the first space 19 and the water portion passing the number of holes 14 will advance into the second space 20. The water which returns to the first space 19 has been damped through the collision against the partitioning member 15, and a portion of the water having a relatively large bounce angle component will be discharged obliquely downward directly through the elongate slots 18 as the early damped water.

That is to say, by setting a relatively large length for the vertical length (d) between the partitioning member 15 and the elongate slots 18, the direction of the portion of the water discharged from the elongate slots 18 by one reflection from the partitioning member 15 can be the obliquely downward direction having a large downward vector component. And, the most of the remaining water discharged from the elongate slots 18 will move like drifting inside the first space 19 and collide against the side face member 16 and/or the partitioning member 15 for a plurality of times, thereby to be changed in direction. Then, this water in a completely damped condition will be discharged from the elongate slots 18.

Figure 3A:
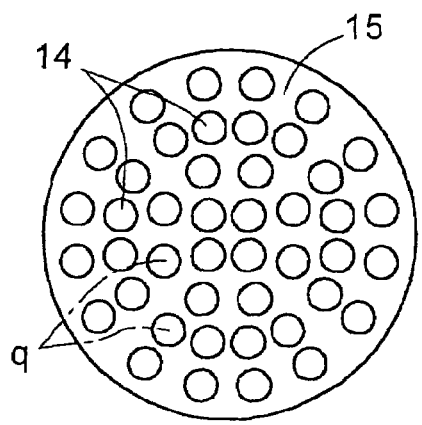
FIG. 3a is a plan view showing a partitioning member and a top face.
Figure 3B:
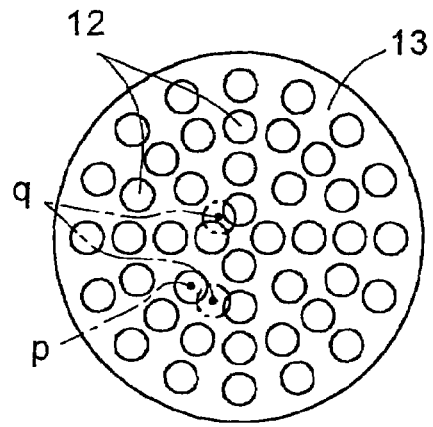
FIG. 3b is also a plan view showing a partitioning member and a top face.

Next, the water portion which has reached the second space 20 will move upward inside the second space 20 and most of it will reach the top face member 13 and then divided into a portion which is discharged upward from the upwardly directed holes 12 and a further portion which is bounced back off the top face member 13 to return to the second space 20. The water portion discharged from the upwardly directed holes 12 will be damped by the constricting effect resulting from its passage through the holes 14 of the partitioning member 15 and the upwardly directed holes 12. And, as shown in FIGS. 3a and 3b, in combined effect with the arrangement of the holes 14 of the partitioning plate 15 and the upwardly directed holes 12 being out of registry from each other in the plan view, said water portion will be damped reliably while its passage through the holes at the two positions and the water portion after being damped will be discharged upwardly.

Incidentally, the upper holes 12 and the lower holes 14 are arranged such that a center (p) of each upwardly directed hole 12 is located between centers (q), (q) of two adjacent holes 14, 14 and also that the center (q) of each hole 14 of the partitioning member 15 is located between the centers (p), (p) of the adjacent upwardly directed holes 12, 13. From the functional point of view, the first space 19 can be understood as a "water hammer chamber" functioning mainly for weakening the momentum of the water whereas the second space 20 can be understood as a "diffusing chamber" functioning mainly for diffusing the water which has been damped to some extent into a multiple of directions.

And, the water portion which was bounced from the top face member 13 and returned to the second space 20 will be discharged directly or after being changed in direction and damped through its plurality of times of collision against e.g. the lateral face member 16, will be discharged laterally from the number of lateral holes 17.

That is to say, the upper and lower spaces 19, 20 of the partitioning member 15 and the wall faces of e.g. the partitioning member 15, located adjacent these spaces 19, 20, together constitute the damping portion (k). And, the number of upwardly directed holes 12 constitute the first discharging portion 8 and the plurality of lateral holes 17 constitute the second discharging portion 9 and the plurality of elongate slots 17 constitute the third discharging portion 10, respectively.

As a result, the water or water portions discharged respectively from the first, second and third discharging portions 8, 9 and 10 will be damped sufficiently and under this condition the water will be discharged to the inside of the filtering tower over a wide angle range from the upward direction to the obliquely downward direction. Consequently, as shown in FIG. 1, there will occur no stirring-up or unevenness in the top surface of the filter medium layer 4, so that the horizontal surface condition may be maintained.

Next, further embodiments than the above-described embodiment will be described.

The main purpose of the diffuser A relating to the present invention is to allow damped liquid to be discharged over a wide range including the upward direction, lateral direction and downward direction. The especially important aspect thereof is how the damped water is to be discharged downward (obliquely downward). In this respect, further constructions described below may be employed alternatively.

Figure 4:
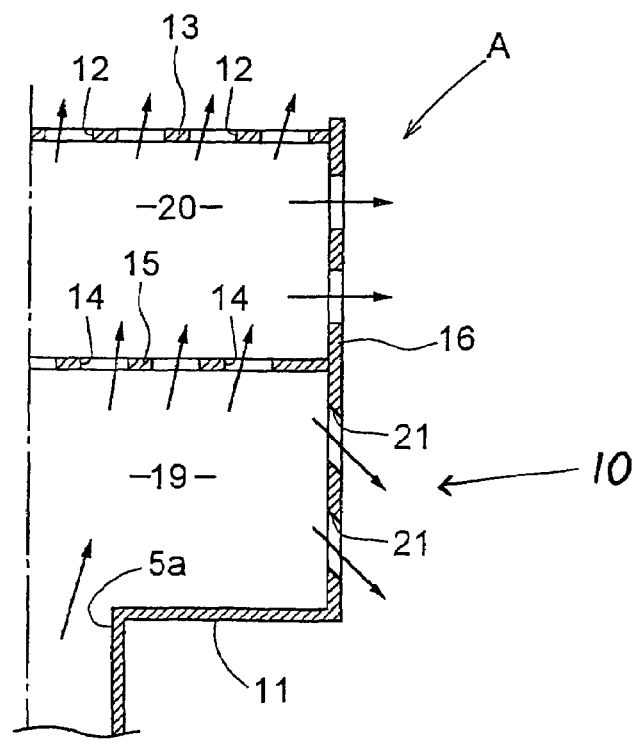
FIG. 4 is a side view in section showing a first alternative construction of principal portions of the diffuser.

As shown in FIG. 4, the third discharging portion 10 may be constructed as obliquely downwardly oriented inclined holes 21 defined in the lateral face member 16.

As shown in FIG. 5, the third discharging portion 10 may be provided as an obliquely extending pipe member 22 attached to the lateral face member 16 so that the member 22 may act as a guide passage 22a for guiding water obliquely downward.

As shown in FIG. 6, instead of providing any openings or holes as the third discharging portion 10 in the lateral face member 16 per se, the outer radius side of the bottom side member 11 may be provided with discontinuity by providing holes or the like, thereby to form the third discharging portion 10.

Figure 7:
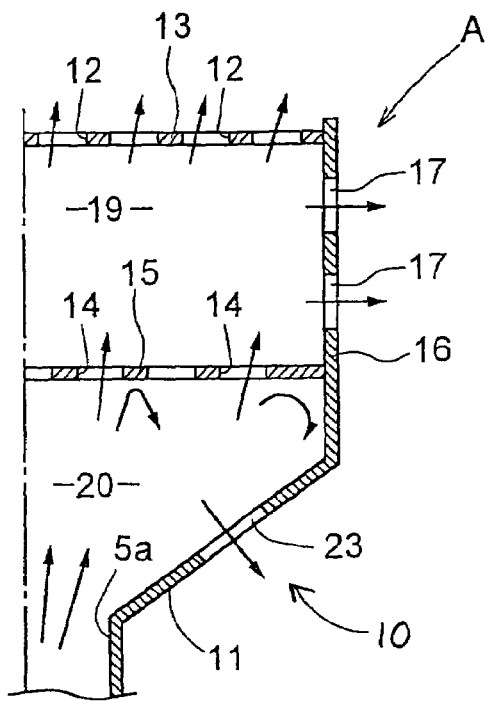
FIG. 7 is a side view in section showing a fourth alternative construction of principal portions of the diffuser.

As shown in FIG. 7, the bottom face member 11 may be formed like a funnel and through holes 23 may be provided at vertically intermediate portions of this funnel-like member, so that the through holes may act as the third discharging portion 10.

Figure 8:
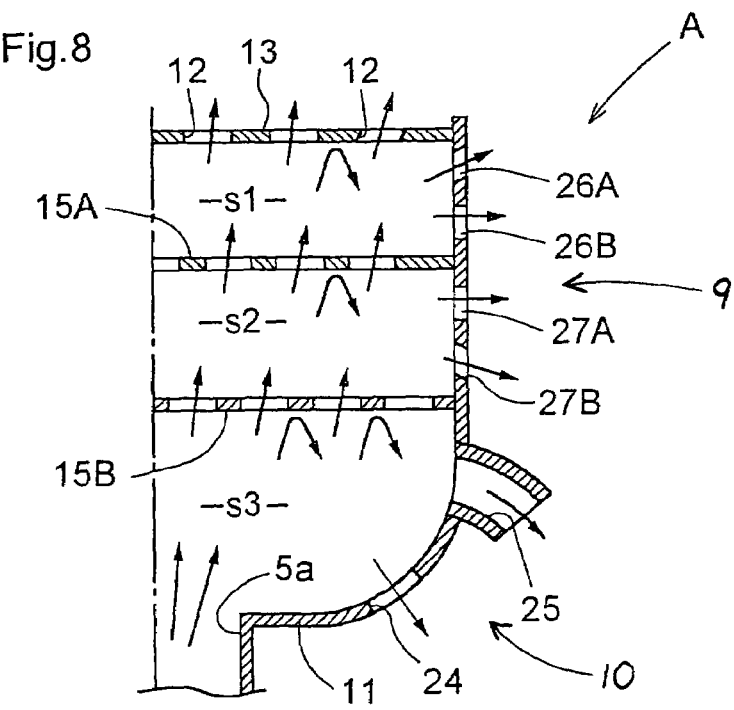
FIG. 8 is a side view in section showing a fifth alternative construction of principal portions of the diffuser.
Figure 9:
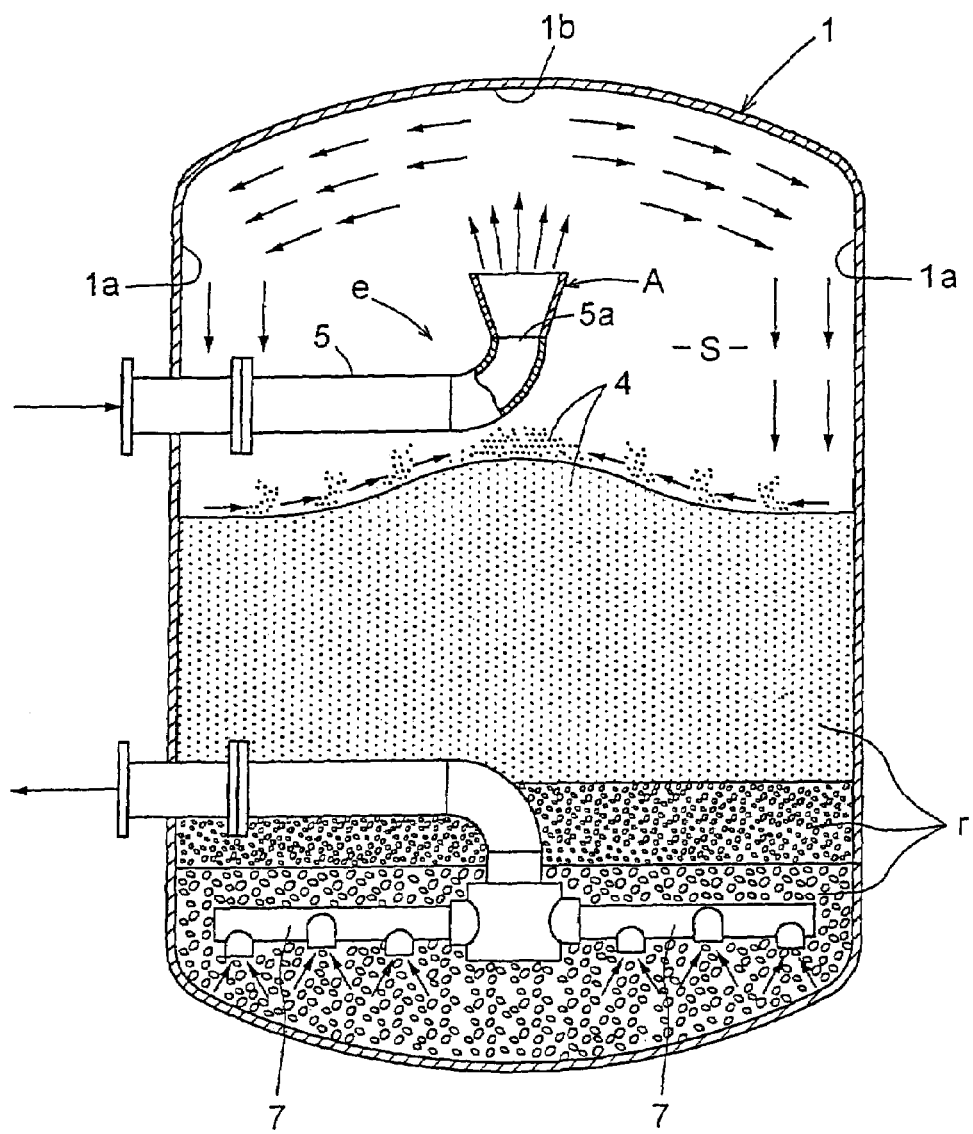
FIG. 9 is a partially cutaway side view showing a conventional filtering apparatus.

As shown in FIG. 8, upper and lower two stages of partitioning members 15A, 15B may be provided for forming upper, intermediate and lower three stages of space portions s1, s2, s3 and a curved-face-like bottom face member 11 having a plurality of holes 24 and a pipe 25 acting together as the third discharging portion 10 may be provided. The lateral face member 16 portion located at the upper space portion s2 defines upwardly directed and laterally directed holes 26A, 26B while the lateral face member 16 portion located at the intermediate space portion s2 defines laterally directed and downward directed holes 27A, 27B. These lateral holes 26A, 26B, 27A, 27B all function as the second discharging portion 9.

Incidentally, the filtering liquid or liquid to be filtered is not limited to water or some water solution, but can be any other liquid such as oil, alcohol or the like. All these are generically referred to herein as "liquid".

As described above, according to the filtering apparatus of the present invention, the existing filtering tower can be used as it is without any enlargement thereof and the filtering liquid may fall uniformly over substantially entire top surface of the filter medium layer. Therefore, even when light-weight filter medium is employed, the flatness in the top surface of the filter medium layer can be maintained easily, so that the filter medium layer and the entire filtering apparatus can achieve their desired filtering performance, hence being suitable for filtering various kinds of filtering liquid in an efficient manner.

What is claimed is:

1. A filtering apparatus comprising, within a filtering tower having a lid: a filtering section, a liquid collecting section disposed downwardly of the filter section, and a liquid feeding section disposed upwardly of the filtering section, the liquid feeding section including a liquid feeding pipe inserted into the filtering tower from an outside thereof and having an orifice oriented upward and formed at a leading end thereof, and a diffuser for acting on a liquid being discharged upward from the orifice;

wherein said diffuser comprises a box body including a number of holes or slots in a lateral face and a top face thereof, said box body includes a damping portion for damping a momentum of the liquid discharged from the orifice, said damping portion comprising a partitioning member defining a number of holes therein and partitioning an inside of the box body between a first lower space and a second upper space, and said box body includes first and second discharging portions disposed upwardly of the partitioning member for discharging a portion of the liquid introduced into the second space through said partitioning member, and a third discharging portion disposed downwardly of the partitioning member for discharging a remaining portion of the liquid reflected from the partitioning member.

2. The filtering apparatus according to claim 1, wherein said box body constituting the diffuser includes a bottom face member defining said orifice, a top face member disposed upwardly of the bottom face member, and a lateral face member extending from the bottom face member to the top face member;

said partitioning member being interposed between the bottom face member and the top face member, and upper and lower spaces partitioned from each other by said partitioning member together form said damping portion;

said first discharging portion comprises a plurality of upwardly directed holes defined in said top face member;

said second discharging portion comprises a plurality of lateral holes defined in said lateral face member at a portion thereof located between said top face member and said partitioning member; and said third discharging portion comprises a laterally elongated slot formed at a portion of said lateral face member at a portion thereof downwardly spaced apart from said partitioning member by a predetermined distance.

3. The filtering apparatus according to claim 2, wherein the holes defined in the partitioning member and the holes defined in the top face member are arranged so as not to be overlapped in a plan view.

* * * * *